United States Patent [19]
Davis et al.

[11] Patent Number: 5,740,436
[45] Date of Patent: Apr. 14, 1998

[54] SYSTEM ARCHITECTURE FOR CONFIGURING INPUT AND OUTPUT DEVICES OF A COMPUTER

[75] Inventors: Lisa Louise Davis, Seattle, Wash.; Gregory K. Mullins, Boulder Creek, Calif.

[73] Assignee: Apple Computer, Inc., Cupertino, Calif.

[21] Appl. No.: 471,656

[22] Filed: Jun. 6, 1995

[51] Int. Cl.$^6$ .............................. G06F 11/32; G06F 13/00
[52] U.S. Cl. .................. 395/651; 395/653; 395/333; 395/685
[58] Field of Search ........................... 395/154, 155, 395/157, 159, 651, 653, 333, 685

[56] References Cited

U.S. PATENT DOCUMENTS 5,428,731  6/1995  Powers, III ...................... 395/154
5,544,297  8/1996  Milne et al. ...................... 395/154
5,559,301  9/1996  Bryan, Jr. et al. ................ 84/653
5,559,948  9/1996  Bloomfield et al. .............. 395/159

*Primary Examiner*—Jack B. Harvey
*Assistant Examiner*—Jeffrey K. Seto
*Attorney, Agent, or Firm*—Burns, Doane, Swecker & Mathis, L.L.P.

[57] ABSTRACT

A system architecture is provided for configuring audio and video components connected to a computer through a textual display and a graphic display, so that users may more easily access and use all of the component capabilities of the system. Groups of related components are integrated into a comprehensive, streamlined, consistent, and coherent user interface so that the user interaction is as straightforward and consistent as possible. A component-based configuration for the connected components permits new components to be easily added.

19 Claims, 5 Drawing Sheets

SYSTEM ARCHITECTURE FOR CONFIGURING INPUT AND OUTPUT DEVICES OF A COMPUTER

FIELD OF THE INVENTION

The present invention is directed to the configuration of a computer to cause it to operate in a desired manner, and more particularly to a system architecture and user interface which permit a user to easily configure a group of systematically related devices of a computer system, such as audio and video components, in a comprehensive manner.

BACKGROUND OF THE INVENTION

As the processing power and popularity of computers continues to grow, the features which they offer to the user also increase. This phenomenon is particularly evident in the field of personal computers, with the rising popularity of so-called "multimedia" computers. These products offer the user a wide variety of capabilities beyond the traditional mathematical calculating operations for which computers were originally known. For example, a single computer might include features which permit users to view, capture and process a video broadcast or a movie recorded on a video cassette recorder, manipulate an electronic version of a photograph, reproduce audio from a compact disc (CD), and synthesize their own music.

Coupled with these increased capabilities, however, are added complexities for the user in terms of controlling the available features and configuring the computer to operate in a desired manner. In known computer systems, a plurality of separate and autonomous interface elements, sometimes known as "control panels", are provided to access and control various features and components of the computer system. For example, in conventional Macintosh® systems (Apple Computer, Cupertino, Calif.), as many as 40 different control panels might be used for a variety of features such as network control, memory allocation, mouse speed control, and desktop control applications. Other control panels are provided to adjust the volume of speakers, change the resolution of scanned images, and modify the number of colors that can appear on a display. The number of control panels continues to increase as the technological capabilities of the system grows.

As the number of control panels increases, the ability to configure the computers to operate as desired become more difficult and confusing for the user. New control panels are usually developed independently from other control panels. Each control panel has its own functionality and there is little or no interdependence between the technology controlled by one control panel and the co-existing technologies controlled by the other control panels. Duplicate functionality of the control panels often result from the new control panels being designed independently. As a result, the control panels are typically not integrated for access, because little or no consideration is given to the other technologies of the computer system as new control panels are developed and added to the computer.

This lack of integration may prevent available technological capabilities from being used in known computer systems. For example, many key features in products might not be employed if users find it too difficult to access these features when configuring the system.

Furthermore, it is difficult for a user to clearly conceptualize a model of the computer system if the user is not highly knowledgeable of each component and connection in the system. Conventionally, an interface which includes an identification of one or more components, and their functions, is provided. In a computer based audio and visual system which is highly spatial and complex, users with little exposure to such components generally have difficulty configuring and using the system with the conventional text-based information, in the absence of an explicit model of the system and its components. It is also known to provide an interface by a general visual representation of the system. However, such representation is done without any regard to the actual relationships between components. As a result, the user still has difficulty visualizing the overall system structure.

Accordingly, it is desirable to provide an interface via which a user can configure various input and output devices of a computer in a comprehensive and easily understandable manner. Further along these lines, it is desirable to provide an overall architecture for the configuration of input and output devices that readily accommodates the addition of new components without increased complexity to the user.

SUMMARY OF THE INVENTION

These and other objectives are achieved in accordance with the present invention by means of a component-based architecture which provides a comprehensive structure to all input and output devices that pertain to a particular function. In an exemplary embodiment of the invention, the architecture provides an interface for the user to configure all audio and video components of a computer system from within a single application. These components are presented to the user within the context of a coherent audiovisual system.

As a further feature of the invention, the components which make up the audio-visual system, or any other collection of input/output devices, are represented to the user in both textual and graphical terms. This dual representation assists the user in developing an effective conceptual model of the system, and facilitates configuration of components that have a logical or functional relationship to one another, such as a digital camera and a display monitor, for example.

BRIEF DESCRIPTION OF THE DRAWINGS

The present invention will become more fully understood from the detailed description of a preferred embodiment given hereinbelow and the accompanying drawings which are given by way of illustration only, and thus are not limitative of the present invention, wherein.

DETAILED DESCRIPTION

To facilitate an understanding of the present invention, it is described hereinafter with reference to its implementation in the control of audio and video components in a computer system. Further, reference is sometimes made to features and terminology associated with a particular type of computer, namely Macintosh® brand computers manufactured and sold by Apple Computer, Inc. It will be appreciated, however, that the principles of the invention are not limited to this particular embodiment. Rather, the invention is applicable to any type of computer in which it is desirable to provide a comprehensive interface for the configuration of a group of systematically related devices.

The embodiments of the present invention are directed to an interface for accessing and configuring components connected to a computer system. While the particular hardware components of the computer system do not form part of the invention itself, they are briefly described herein to provide a thorough understanding of the manner in which the features of the present invention cooperate with the hardware of the computer system to produce the desired configuration.

Figure 1:
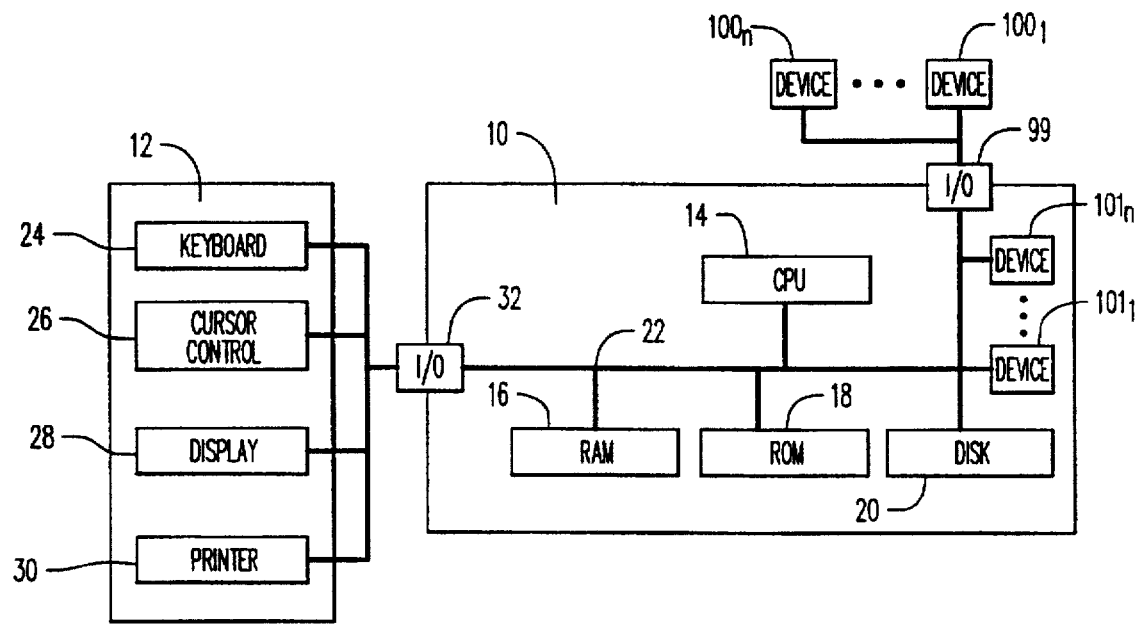
FIG. 1 illustrates an exemplary computer system having an audio and video system, of a type in which the present invention can be employed.

Referring to FIG. 1, an exemplary computer system that can be used in an embodiment of the present invention includes a computer 10 having a variety of external peripheral devices 12 connected thereto. The computer 10 includes a central processing unit (CPU) 14 and associated memory. The associated memory generally includes a main memory which is typically implemented in the form of a RAM 16, a static memory such as a ROM 18, and a permanent storage device such as a magnetic or optical device 20, for example. The CPU 14 communicates with the memory through an internal bus 22 and with the external peripheral devices 12 by one or more input/output ports 32. The peripheral devices 12 include a data entry device such as a keyboard 24 and a pointing or cursor control device 26, such as a mouse, trackball, pen or the like. A display device 28, such as a CRT monitor or an LCD screen, is also included in the external peripheral devices 12 for providing a visual display of the information that is being processed within the computer 10. A hard copy of the processed information can be provided through a printer 30, or another similar device, which is also included in the external peripheral devices 12.

FIG. 1 further illustrates a plurality of other external components $100_1, \ldots 100_n$, which may be connected to the computer 10 by one or more input/output ports 99 and which communicate with the CPU 14 and the memory through the internal bus 22. The computer 10 may also include a plurality of built-in components $100_1, \ldots 100_n$, which communicate with the CPU 14 and the memory through the internal bus 22.

In the illustrated embodiment of the invention the external and built-in components $100_1, \ldots 100_n$ and $101_1, \ldots 101_n$ comprise audio/video components. These types of components can be classified according to the following four function categories: audio input, audio output, video input and video output. Components in the audio input category are sound producing devices, such as microphones, CD players, video cassette recorders, audio cassette players, television tuners, and telephone connections. Audio output components include sound receiving devices such as speakers, headphones, video cassette recorders, and audio cassette recorders. Video input components include video cameras, video cassette recorders, and television tuners. Video output components comprise such devices as monitors, television sets, and video cassette recorders, for example.

Generally speaking, the present invention is directed to a user interface which permits a user of the computer to configure each of these various components. In the context of the present invention, the term "configure" includes the activation and deactivation of the various input and output devices, as well as the adjustment of individual settings associated with each device. Examples of such settings include sound volume for speakers, sensitivity for microphones, brightness and contrast for video monitors, and program tracks for CD players. In accordance with the invention, a comprehensive and consistent approach to the configuration of all of the audio and video devices is provided by means of a component-based architecture for the audio-visual control interface.

Figure 2:
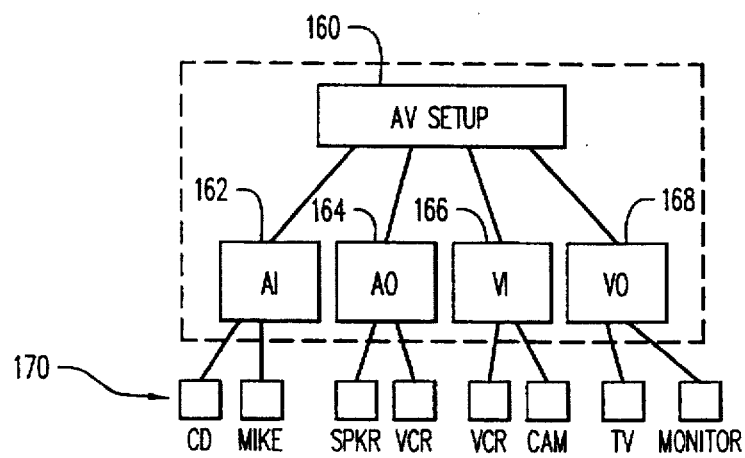
FIG. 2 illustrates a component-based architecture for audio and video devices in an embodiment of the present invention.

FIG. 2 is a block diagram illustrating an example of a component-based architecture for an audio/video control interface, in accordance with the present invention. At the highest level of the structure, through which the user interacts with the control system, is an AV setup module 160. Depending from this module are four function modules, or category components, 162, 164, 166 and 168, which are respectively associated with the four categories of audio input, audio output, video input and video output. The AV setup module and the four function modules together form a shell, or framework, which defines the basic structure of the interface. Communicating with each of the function modules are individual component modules 170 which respectively pertain to the audio and video components. These modules effectively function as device drivers for their respective components. Depending upon the particular component, these modules can be part of the computer's operating system, or exist as stand-alone items of software. For example, a computer's internal speaker is typically controlled by the operating system. Thus, the component module for this particular device is contained within the operating system software. On the other hand, more complex devices such as multisynchronous monitors with integral speakers are more likely to have specialized drivers which are separately installed in the computer's memory.

The embodiment illustrated in FIG. 2 shows two component modules 170 depending from each function module. It will be appreciated, of course, that this illustration is merely exemplary, and that any number of component modules can communicate with the function modules, in dependence upon the hardware configuration of the system.

In operation, when the computer system boots up, each component module registers itself with one of the function modules. More particularly, each of the component modules 170 operates in a manner similar to a device driver. At computer boot time, each module is loaded into the computer's memory and, upon doing so, sends out a signal to determine whether its associated device is connected to the computer system. If it receives a positive response, the component module registers itself with the appropriate function module. If no response is received, the component module does not register itself, i.e. the interface is unaware of its existence.

Based upon information provided during the registration process, the setup module 160 and the function modules 162–168 generate an interface via which the user can configure each of the registered devices. This interface comprises a main window which provides the user an overall view and general control of the audio and video system. The interface also includes various sub-windows which provide control over the specific features of the individual components.

Figure 3:
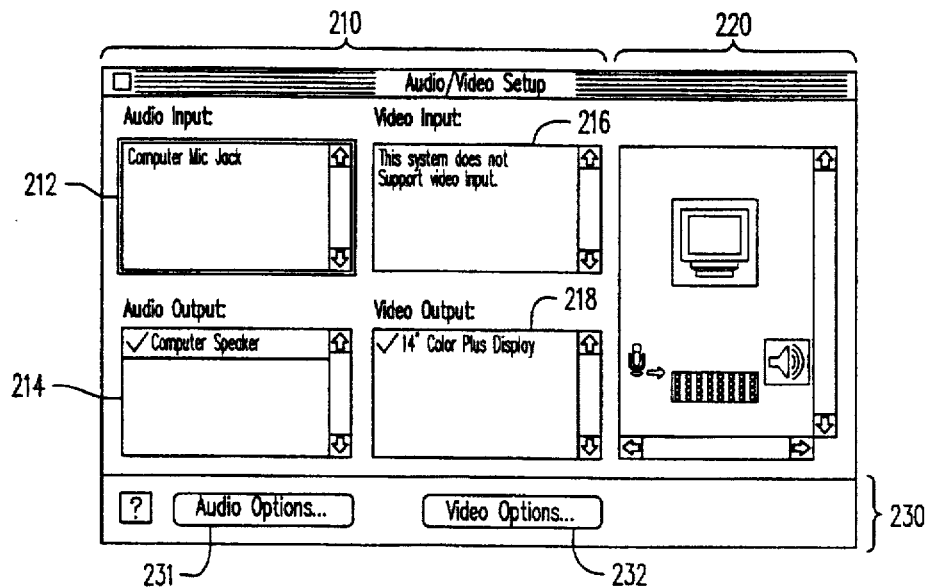
FIG. 3 illustrates an example of a main window generated by the audio and video control interface for an embodiment of the present invention.

FIG. 3 illustrates an example of a main window for the user interface. This window is presented to the user when the audio/video setup feature is accessed on the computer. The main window 200 has a "list" view 210 for providing a textual identification of the connected audio and video components that have registered themselves, and a "map" view 220 for providing a graphical display of the connected audio and video components. The bottom portion 230 of the main window 200 further includes examples of buttons 231 and 232 that access system-wide audio and video settings, respectively. Alternatively, the main window 200 may provide only a list view 210 or a map view 220, as desired by the user.

In a preferred embodiment, the A/V setup feature can be an application program residing in a control panel folder within a system folder, for instance. When the A/V setup feature is installed on a computer, any existing audio or video control panels are preferably overridden.

In the example of FIG. 3, the list view 210 includes four scrollable category lists. The four scrollable category lists in this example are: an audio input list 212, an audio output list 214, a video input list 216, and a video output list 218. These category lists include all of the audio and video components which registered with the interface. Each component is represented by a text label. If no device of a particular function category has registered with the interface, an indication to that effect appears in the category list. For example, if no video input devices are present, a message may appear in the video input list 216, such as: "This system does not support video input."

Users may conventionally interact with the category lists by using a mouse, for example, to check and uncheck items in each of the scrollable lists by clicking on the items. A single click on a list item, for example, selects the list, selects the item by highlighting, and toggles the associated device on or off. To avoid accidental actuation and deactuation of components, the portion of the display in which a click is effective to toggle the on/off states can be limited to a smaller area than the entire entry. For example, it might be limited to the vertical column in which the check mark appears. Other conventional approaches for interacting with textual and graphical items can be provided as well.

When a component is "active", in the sense that the CPU 14 sends or receives audio and video signals to and from the corresponding device, it is represented as being active with a check-mark as illustrated in FIG. 3, for example. In the case of audio input devices, the active device serves as the source for playing sound. Sounds from the computer 10 and from the active input device play through all of the active audio output devices. When a video input device is activated, the video input signal from that device is displayed within a window on the monitor or other video output device. If there is more than one video output device, the user can designate which one should display the video signal.

The audio and video input lists 212 and 216 are preferably single selection lists and the audio and video output lists 214 and 218 are preferably multiple selection lists. All of the lists allow users to de-select all of the menu items (whereby nothing is active) with one exception. The one exception is that at least one video output device should always be active so that the system may operate. Preferably, each time a user deactivates a video output, a cautionary message can appear which warns the user that deactivating the video output device will cause all objects currently visible on the video output device to be moved on to an active video output device.

In single selection lists, a device may be toggled between on and off states by clicking on its name. Whenever a device is activated, the other devices are deactivated. In multiple selection lists, clicking toggles the device between on and off states, but has no effect on the other devices. Items can also be checked and unchecked by selecting a device and either activating or deactivating the item. In both the single and multiple selection lists, the item most recently clicked is selected by being highlighted, for example. Such a highlight is present whether the last click activates or deactivates the device.

In the example for the audio and video system illustrated in FIG. 3, the righthand portion of the main window 200 is the map view 220 which is a graphical representation of the computer system and the various audio and video components connected thereto. In contrast to the list view 210, the physical characteristics and connections of the system devices are accurately reflected in the map view 220. For example, to achieve an accurate physical representation, each built-in audio and video device appears immediately adjacent to the CPU or another device (a display in most cases) that houses the specific built-in device. The representation for each external audio and video device is also adjacent to the system component or the video output to which the device is connected. The display can include an indication, such as an arrow for example, which indicates the direction of the connection.

Each audio and video device is generally allocated to a specific region within the map view 220 in this example. Video output devices may occupy the top half of the map view 220, the CPU may occupy the center of the lower portion of the map view 220, audio devices may be to the left of the CPU with the input devices above and the output devices below, and video input devices may be to the right of the CPU for instance. For this purpose, the display area of the map view can be structured as a grid, and each class of component is allocated a predefined cell or block of cells on the grid.

Figure 4:
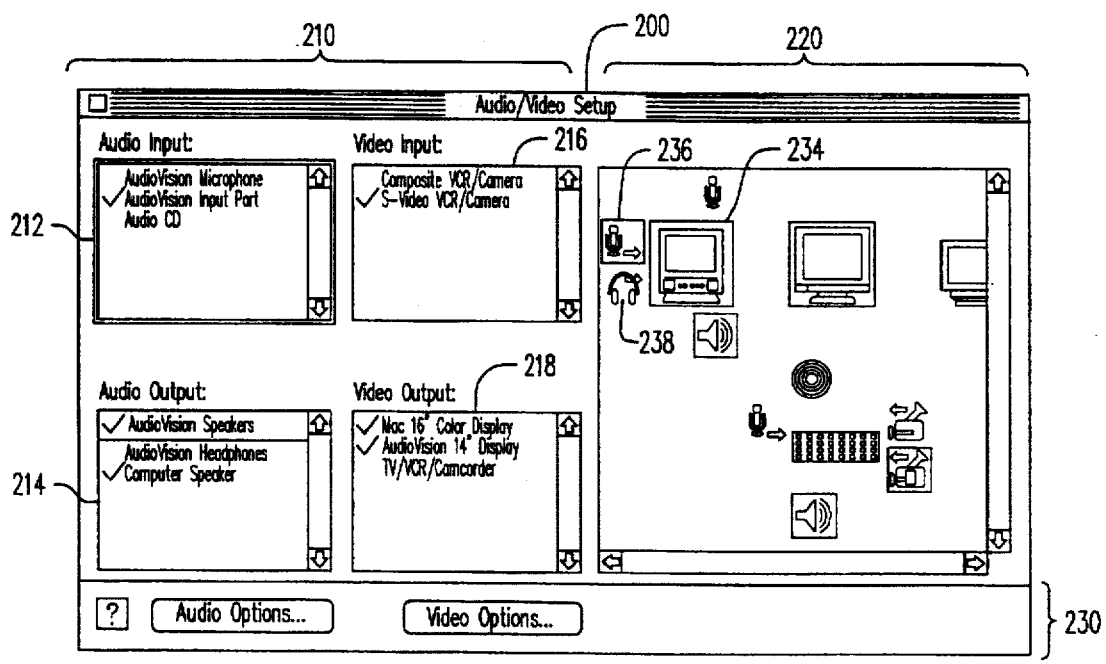
FIG. 4 illustrates an example of an active list display used by the audio and video system in an embodiment of the present invention.

Whenever a component module 170 communicates to the set-up control panel that components are connected to the computer indirectly (via other audio/video devices, for example), the map view 220 is adjusted to reflect the actual connections. In the example of FIG. 4, an A/V display 234 has a built-in microphone 236 and headphones 238 that are plugged-in. They are shown to be connected to the display by arrows in the map view 220.

When devices belong to more than one audio, video, input, or output category, such as an A/V display having video output, audio input, and audio output capabilities, these capabilities are represented as they actually exist in the map view 220 by being all housed within a single device. In the case of the A/V display, the computer determines from information provided during registration that these features are available and are physically located within the A/V display. In another example where a conventional VCR is used, the computer has no way of knowing that the various audio and video inputs and outputs are related to a single device. Therefore, these devices are displayed in predetermined regions of the map view 220 as separate devices which are each attached independently to the computer.

Similar to the list view 210, the map view 220 shows activation status of the components, for example by highlighting or inverse video. The map view also provides a mechanism for activating and deactivating devices. For example, clicking on the icon representation of a component can toggle it between the on and off states.

The overall structure of the main window is defined by the AV setup module 170, and the information displayed within the individual text panels 212–218 is based on the information obtained by the function modules 162–168 at boot time. Similarly, the specific icons which are shown in the map view 220, as well as their location, is determined by the AV setup module, based on data received by the function modules.

A second level of the user interface provides the user with controls for the individual features of a specific component. These controls appear in sub-windows that are accessed via the main window. The sub-windows are opened when the user selects an item in a particular A/V category of the list view 210 or an icon in the map view 220 of the main window 200, for example. Each sub-window is port specific and presents a user interface for port attribute configuration. When an item in the A/V category panel component or icon representing a port in the map view component is selected, a sub-window is opened for that particular port. The sub-window represents a user interface for a particular A/V port so that the user can configure various attributes of the A/V port.

Figure 5:
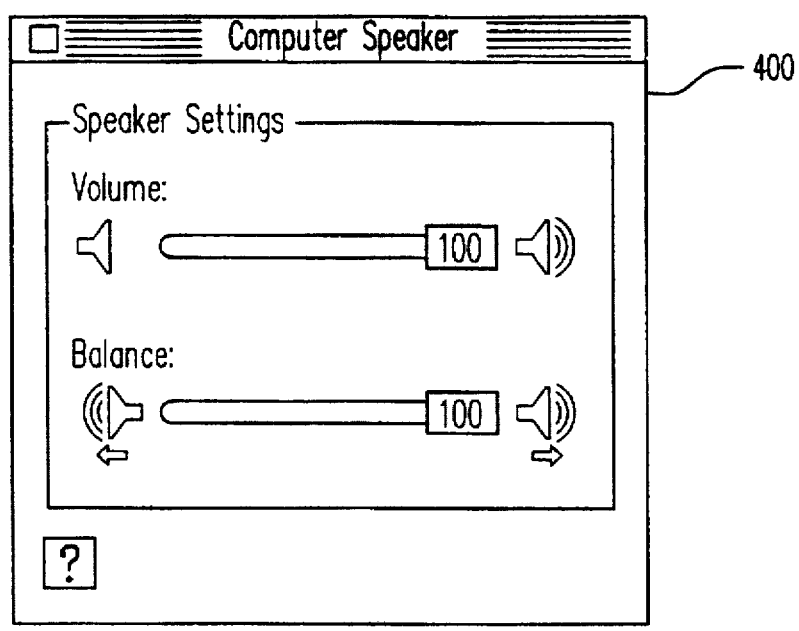
FIGS. 5–8 illustrate examples of sub-windows used in embodiments of the present invention.

Each of the audio and video devices has a sub-window that contains its own configuration settings according to its organizational strategy in this component-based system. FIG. 5 illustrates an example of a sub-window 400 for a computer's built-in speaker. The only settings used for the sub-window 400 of the built-in speaker of the computer 10 are volume and balance controls. The values associated with the volume may be represented by a slider range from 0–100, and the values associated with the balance may be represented by a slider range from 50–100, for example. Whenever any volume or balance control is adjusted, the new volume or balance level is reflected in the sub-window 400. The sub-windows are opened in a conventional manner, such as by double clicking a device in either the list view 210 or the map view 220 of the main window 200 or by selecting the device, for example. In addition, two sub-windows are dedicated to the system-wide audio and video settings and are opened by pressing buttons 231 and 232 labeled as "audio options" and "video options" as illustrated in FIG. 3, or other appropriate indications.

Figure 6:
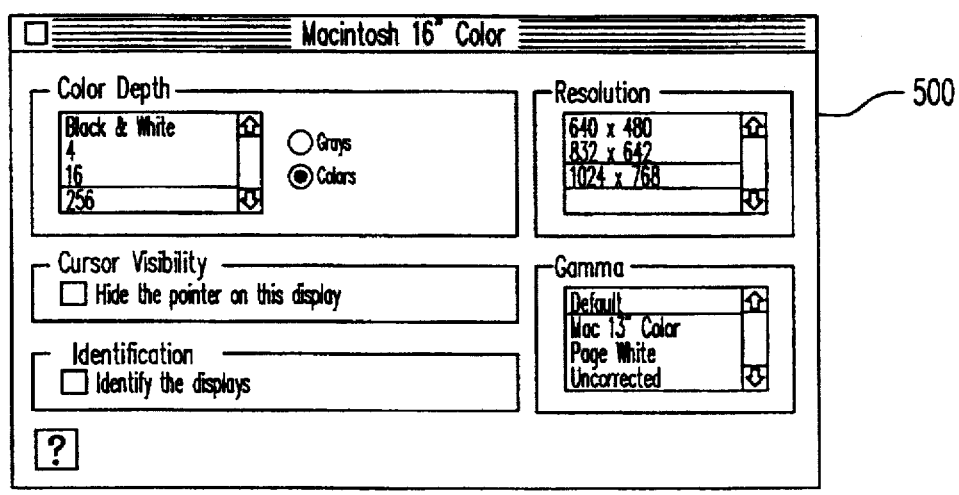

A typical display sub-window 500 is illustrated in FIG. 6, for example. Even though display features vary, the display sub-window 500 illustrated in FIG. 6 is representative and includes settings for color depth, resolution, special gamma, cursor visibility, and a check box for showing or hiding display identification windows. This representation is derived based on the organizational strategy for the sub-window.

Figure 7:
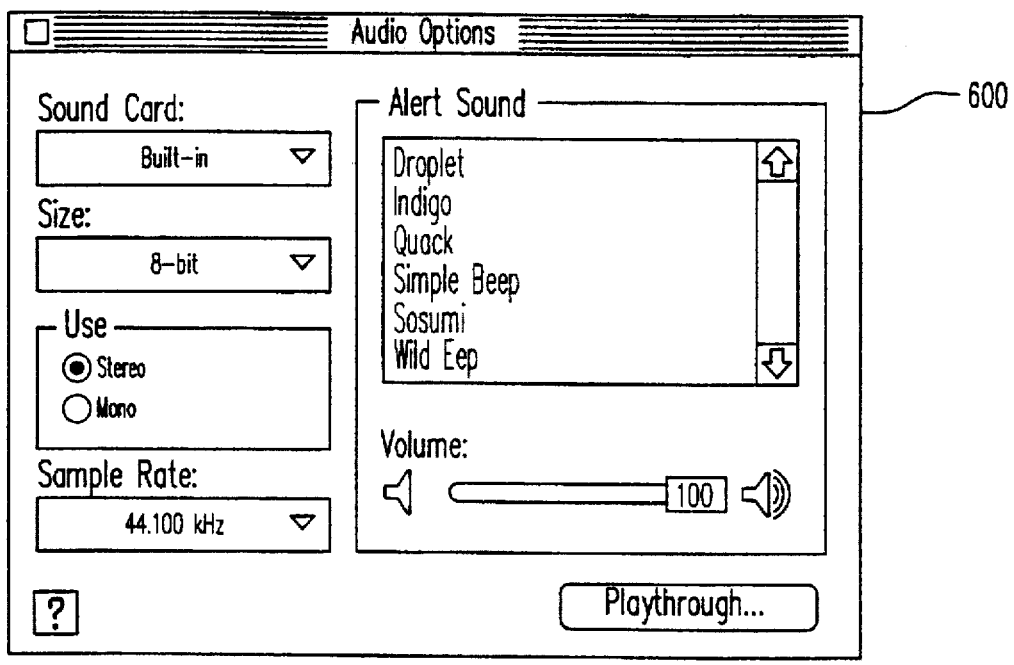

FIG. 7 illustrates an example of an audio options sub-window 600 that is displayed when the user actuates the audio options button 231 in the main window. The audio options sub-window 600 includes two types of settings that pertain to the computer system as a whole. One type of setting is an alert sound control setting which simply includes a list of available alert sounds and a volume slider. The second type of setting is a sound capability setting which relates to the specific sound hardware being used.

Figure 8:
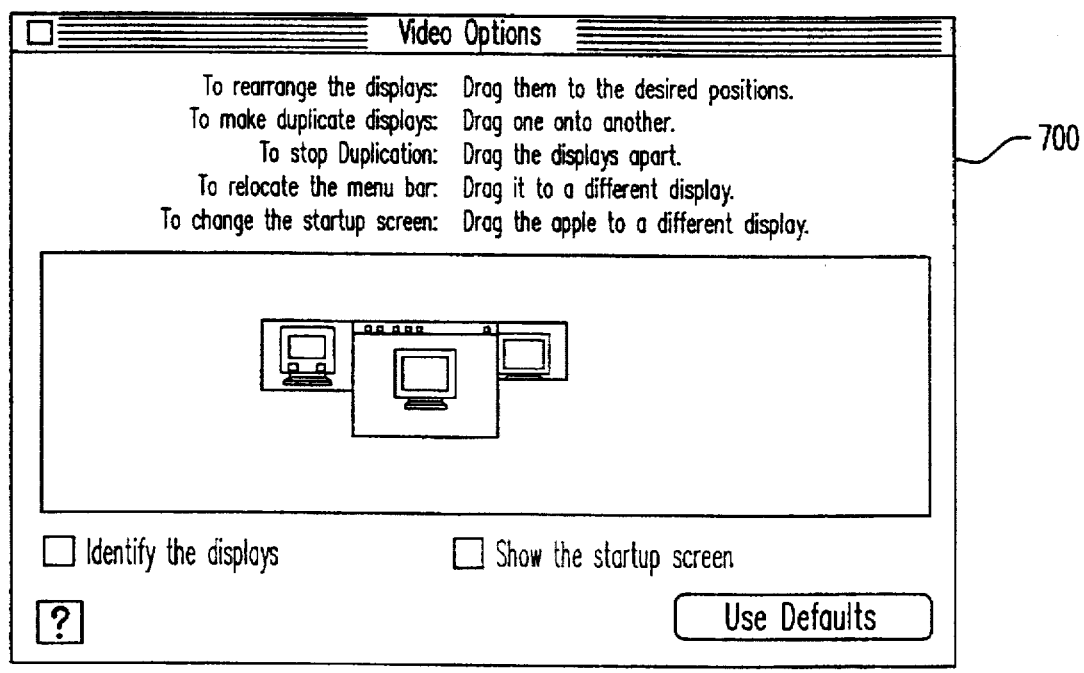

A video options sub-window 700 that appears in response to actuation of the video options button 232 is illustrated in FIG. 8. The video options sub-window 700 allows users to specify whether a display is an extension or a duplicate of another display; to arrange the displays in relation to one another; and to choose the location of a menu bar and a start-up screen. These actions are only possible if more than one video output device is present and active. If there is only one video output device present and active, the video options button 232 of the main window 200 is disabled.

The settings which appear in each sub-window are based on the available features for the corresponding audio or video device. In accordance with the invention, the sub-windows are not hard coded in terms of content or layout. Rather, they are assembled dynamically from the component-based configuration. As described previously, at system start-up the various components register themselves. Included within the registration data is an identification of the specific features associated with each component. For example, a simple built-in speaker may have only a volume control, whereas stereo speakers may have controls for volume, balance, treble and bass. The interface employs this information to determine which controls to draw in the sub-windows for the components. The component-based architecture makes the set-up control panel more flexible because the features can be modified or added without an extensive recoding effort. Since the content and layout for each sub-window are not fixed, as new features and devices are developed, the sub-windows can readily adapt, to present the settings to the user in an appropriate manner.

Figure 9:
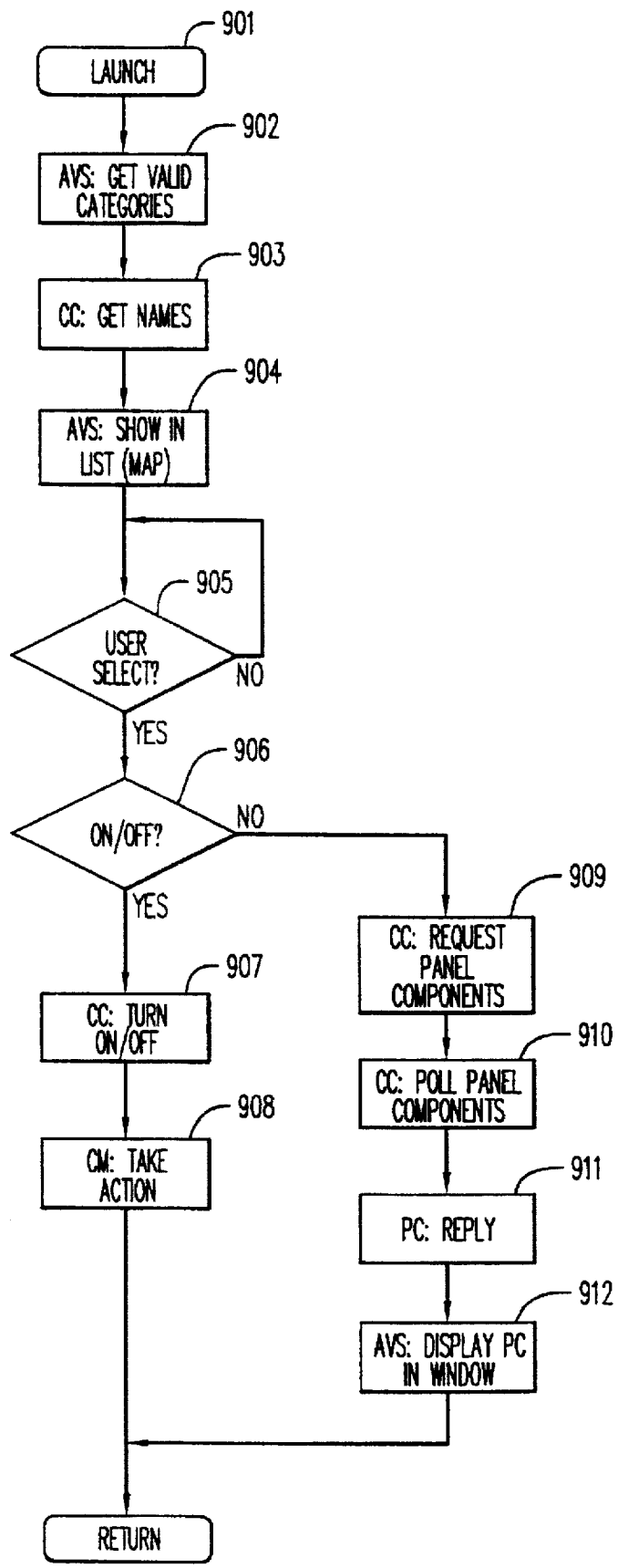
FIG. 9 is a flowchart of the operation of the user interface.

A flowchart which depicts the operation of the user interface is shown in FIG. 9. The depicted operation begins when the user launches the AV Setup program at Step 901, for example by means of a control panel (not shown). Once launched, the AV Setup module 160 determines which functional categories are valid at Step 902, by inquiring of each category component 162–168 whether it has registered any components. For each category component which provides a positive response, the setup module 160 requests an identification of the registered components. In response, the category component sends a call to the registered component modules at Step 903 to get each one's name, which is passed on to the setup module and displayed in the list 212–218 for that category (Step 904). In a similar manner, the appropriate icon is displayed in the map view 220.

Once the main window has been generated in this manner, the interface waits for a user action with respect to one of the displayed components. When the user selects a component at Step 905, a determination is made at Step 906 whether the user requested an on/off toggle (for example by means of a single click of the mouse button) or a sub-window (designated by a double-click). If the requested action was an on/off toggle, at Step 907 the category component 162–168 instructs the appropriate component module to turn its associated component on or off, as the case may be. The functionality for actually turning the device on or off resides in the component module 170, which takes the steps necessary to carry out the requested action at Step 908.

If the user had requested a sub-window to be opened at Step 906, the appropriate category component 162–168 requests the operating system to provide an identification of all panel components, i.e. control objects, that are available, at Step 909. Upon receiving this information, the category component individually polls each panel component at Step 910, and inquires whether it is capable of working with the particular component selected by the user. Each panel component contains information which identifies the specific devices with which it can communicate, and replies to the inquiry at Step 911. Thus, for example, if the selected device is a speaker, a volume control panel component will provide a positive response, whereas a brightness control will not. Each panel component which provides a positive response is included in the sub-window at Step 912. From this point on, the operation of the sub-window is the same as a conventional control panel, and is therefore not described herein.

Since the sub-windows are generated by the A/V setup module, basic behaviors and appearances may be shared.

For example, all sub-windows can open and close in the same manner, and, have a consistent appearance in terms of color and font. Some sub-windows may possess a default selection which restores all the settings in the sub-window to their original factory default value.

The component-based architecture which permits windows to be dynamically generated results in an interface which is easy to use, powerful, flexible, and extendible. These requirements can be best implemented with a dynamic linked library. In this regard, a particular dynamic linked library technology which has been found suitable for this task is the Component Manager, developed by Apple Computer, Inc.

The control interface of the present invention integrates all the settings and controls for related features into a comprehensive, streamlined, consistent, and coherent user interface. The interface includes a combination of a textual display and an accurate graphical representative display so that users with little system experience may be able to access and use all of the capabilities of the components. The component-based configuration permits new components to be easily added. Similarly, individual component modules can be easily replaced, for example to correct a bug or provide updated functionality, without the need to rewrite a substantial amount of the code for the interface.

Although the specific examples have been directed to audio and video devices, the same principles may be applied to the configuration of other groups of systematically related components of a computer.

The invention being thus described, it would be apparent that the same may be varied in many ways. Such variations are not to be regarded as a departure from the spirit and scope of the invention, and all such modifications as would be apparent to one skilled in the art are intended to be included within the scope of the following claims.

What is claimed:

1. A computer system having a plurality of audio and/or video components, comprising:

a plurality of component modules which are respectively associated with said audio and video components, each of said component modules being responsive to user-generated commands for configuring the associated components to operate in a specific manner; and a configuration framework which communicates with each of said component modules to determine which audio components are contained in said computer system, and to provide an interface via which users generate said commands.

2. The computer system of claim 1 wherein said configuration framework comprises a setup module which generates said interface and a plurality of function modules each of which communicates with selected ones of said component modules to detect features that pertain to each of the components and provide information to said setup module for generating said interface.

3. The computer system of claim 2 wherein said function modules are respectively associated with different functional categories of said components.

4. The computer system of claim 3 wherein said categories respectively comprise audio input, audio output, video input and video output.

5. The computer system of claim 2 wherein said function modules communicate with each of said component modules to determine which ones are associated with components that are operationally connected to the computer system, and registers each component module having a connected component with said setup module.

6. The computer system of claim 2 wherein said function modules determine interface elements for each of the detected features and identifies said elements to the setup module for generation of said interface.

7. The computer system of claim 2 wherein said interface provides a user with the capability to selectively activate components, and said function modules communicate commands entered via said interface to said component modules, to control the actuation of associated components.

8. The method of claim 7 wherein said communicating step includes the step of determining the parameters of an operationally connected component that are capable of being controlled by a given component module, and wherein said method includes the further steps of:

storing a plurality of control objects that respectively relate to different parameters that can be controlled by component modules; and displaying selected ones of said control objects in said user interface which pertain to the parameters that were determined in said communicating step.

9. A computer system having a plurality of user-configurable components, comprising:

a plurality of component modules which are respectively associated with different user-configurable components, each of said component modules being responsive to user-generated commands to control at least one parameter that relates to the configuration and operation of its associated component;

a function module which communicates with the component modules to determine whether a component capable of being controlled by each component module is available in the computer system and, if so, which parameters of the component are capable of being controlled by the component module; and a display controller which causes a user interface to be displayed via which users generate said commands to control said parameters, said display controller being responsive to said function module such that said user interface permits users to generate commands which pertain only to the parameters which are capable of being controlled by the component modules that have an available associated component in the computer system.

10. The computer system of claim 9 comprising a plurality of function modules which are respectively associated with different functional categories of components.

11. The computer system of claim 10 wherein said functional categories include audio in, audio out, video in and video out.

12. A computer system having a plurality of user-configurable components, comprising:

a plurality of component modules which are respectively associated with different user-configurable components, each of said component modules being responsive to user-generated commands to control the configuration and operation of its associated component;

a function module which communicates with the component modules to determine whether a component capable of being controlled by each component module is available in the computer system; and a display controller which causes a user interface to be displayed having control elements via which users generate said commands to control said component modules, said user interface containing control elements that pertain only to those component modules which have an available associated component in the computer system.

13. The computer system of claim 12 comprising a plurality of function modules which are respectively associated with different functional categories of components.

14. The computer system of claim 13 wherein said functional categories include audio in, audio out, video in and video out.

15. A computer system having a plurality of user-configurable components, comprising:

a plurality of component modules which are respectively associated with different user-configurable components, each of said component modules being responsive to user-generated commands to control at least one parameter that relates to the configuration and operation of its associated component;

a function module which communicates with the component modules to determine whether a component capable of being controlled by each component module is available in the computer system and, if so, which parameters of the component are capable of being controlled by the component module;

a library of user-manipulatable control objects that respectively relate to different controllable parameters; and a display controller which causes the display of a user interface having control objects from said library which pertain to the parameters that are capable of being controlled by the component modules that have an available associated component in the computer system.

16. The computer system of claim 15 comprising a plurality of function modules which are respectively associated with different functional categories of components.

17. The computer system of claim 16 wherein said functional categories include audio in, audio out, video in and video out.

18. A method for providing user control of the operation of components in a computer system, comprising the steps of:

storing a plurality of component modules which are respectively associated with different user-configurable components, each of said component modules being responsive to user-generated commands for configuring an associated component to operate in a specific manner;

communicating with said component modules to determine whether a component capable of being controlled by each component module is operationally connected to the computer system; and displaying a user interface having user-controllable elements which pertain only to those component modules for which an associated component is operationally connected to the computer system.

19. The method of claim 18 wherein said communicating step takes place upon start-up of the computer system.

* * * * *

UNITED STATES PATENT AND TRADEMARK OFFICE
CERTIFICATE OF CORRECTION

PATENT NO. : 5,740,436
DATED : April 14, 1998
INVENTOR(S) : Davis, et al.

It is certified that error appears in the above-identified patent and that said Letters Patent is hereby corrected as shown below:

In Claim 1, at column 9, line 46, delete "audio components are" and insert --components are--.

Signed and Sealed this

Twenty-first Day of September, 1999

Attest:

Q. TODD DICKINSON

*Attesting Officer*   *Acting Commissioner of Patents and Trademarks*